No. 680,246. Patented Aug. 13, 1901.
J. H. HARRIER.
METHOD OF SLAKING LIME.
(Application filed Sept. 14, 1900.)
(No Model.)

Witnesses:
Joseph Frease.
Thos. F Hess.

Inventor:
James H. Harrier,
Per Harry Frease. Attorney.

UNITED STATES PATENT OFFICE.

JAMES H. HARRIER, OF NORTH INDUSTRY, OHIO.

METHOD OF SLAKING LIME.

SPECIFICATION forming part of Letters Patent No. 680,246, dated August 13, 1901.

Application filed September 14, 1900. Serial No. 30,053. (No specimens.)

*To all whom it may concern:*

Be it known that I, JAMES H. HARRIER, a citizen of the United States, residing in North Industry, in the county of Stark and State of Ohio, have discovered and invented a new and useful Improvement in the Art of Slaking Lime to Produce Fertilizing-Lime, of which the following is a specification.

My discovery and invention relate to an improvement in the art of making fertilizing-lime from ordinary limestone, and have for their object the production of a more effective and quickly-acting fertilizer than has heretofore been obtained from limestone by a process which is practical, simple, and economical. I attain this object by the method illustrated in the accompanying drawings, in which—

Figure 1:
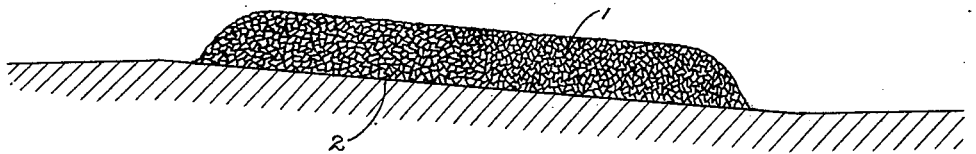
Figure 2:
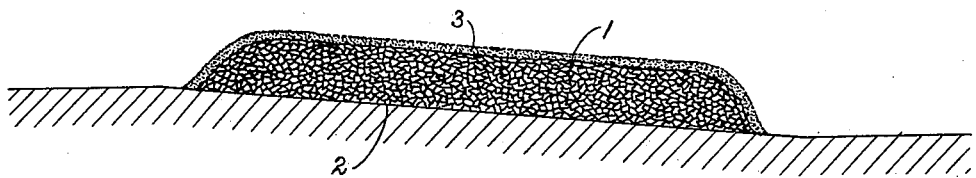
Figure 3:
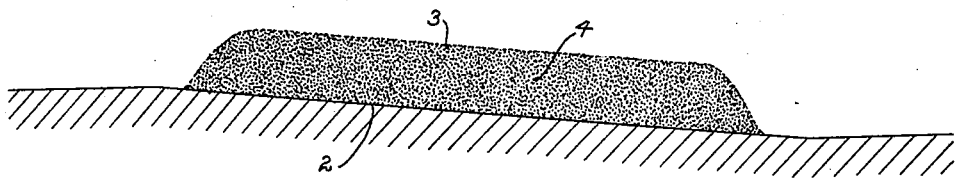

Figure 1 is a transverse section of a body of quicklime spread on an inclined surface ready for slaking; Fig. 2, a similar section showing the powdered covering of the quicklime after the same has been wet or moistened, and Fig. 3 a similar section showing the lime after the slaking is done.

Similar numerals refer to similar parts throughout the several views.

Lime has been used as a fertilizer for many centuries, being generally burned and hauled over the fields in wagons and scattered with shovels, and in later years efforts have been made to distribute it by drills. At first the lime was taken from the kilns and ground fine; but as lime will always heat (slake) after it is burned when it comes in contact with moisture this ground quicklime would heat and kill the germs of the grain, and so the method was abandoned. Next the unburned limestone was ground fine and used in drills; but as this form of lime is not effective as a fertilizer it was abandoned, and lastly air-slaked lime was tried; but it packs in the drills and, furthermore, is not an effective fertilizer the first season and is never fully efficient for the reasons stated below.

Limestone, chemically known as "lime carbonate," ($CaCO_3$,) is subject to the following reactions: On being burned in a kiln the carbonic-acid gas ($CO_2$) separates, leaving lime oxid, ($CaO$,) or quicklime. When quicklime ($CaO$) is exposed to moisture, it takes up water ($H_2O$) and forms lime hydrate, ($CaH_2O_2$,) or slaked lime, considerable heat attending the formation, and when slaked lime ($CaH_2O_2$) is exposed to the air it takes carbonic-acid gas ($CO_2$) therefrom and forms again the carbonate plus the contained water, ($CaCO_3+H_2O$.) Both lime oxid (quicklime) and lime hydrate (slaked lime) have great affinity for carbonic-acid gas, and after a lapse of time these forms are gradually converted back to the carbonate, so that ordinarily slaked lime contains a mixture of hydrate and carbonate, the amount of each depending on the age of the material.

The value of lime as a fertilizer depends on the amount of hydrate it contains and is proportionally destroyed by the presence of the carbonate. The oxid would do as well if it were not for its heating effect when it combines with water. The hydrate and oxid are alkaline and form soluble salts with materials in the soil, which are beneficial to plant life and also neutralize any acids which may be there. Acids in the soil also act on the carbonate, forming the same results ultimately, but not nearly so readily, and the reaction is dependent entirely on the acidity of the soil. Lime that is air-slaked is slaked so slowly that by the time it is thoroughly slaked the bulk of it has gone to the carbonate, thus largely destroying its usefulness as a fertilizer, and water-slaked lime, when the water is not proportioned and the air is not excluded, neither slakes evenly nor completely, is not in suitable form for drilling or for mixing with the ground, nor is it free from the oxid and the carbonate.

From the above explanation it is apparent that a pure lime hydrate in a suitable form for drilling and mixing with the ground is the most efficient form of lime for fertilizing purposes, and that is substantially what I produce by the following process.

Ordinary limestone is crushed or broken into small pieces and burned in kilns in the usual manner. When taken from the kilns, the quicklime 1 is spread on an inclined surface 2 and water is turned or thrown on it for about two minutes, (say forty pounds of water to one hundred pounds of lime,) such water as is not absorbed by the lime or does not adhere thereto draining off the inclined surface. The quicklime so moistened is then completely covered by a suitable powdered material 3, preferably pulverized slaked lime, to exclude the air, after which the quicklime completely slakes in about one hour and in so doing pulverizes and dries by its own heat into a uniformly fine flour or powder 4 of a gray color, which is substantially pure hydrate of lime, with little or no free lime (oxid) left, having been slaked so rapidly and been protected from the air by the powdered covering that there is substantially no carbonate formed. The inclined surface 2 may be the surface of a non-porous solid, as of wood, metal, or cement; but in practice the ordinary surface of the ground is prepared on an incline, and if the material is not non-porous it becomes so after one or two lots of lime have been slaked by particles of lime entering the interstices and forming a sort of cement filling. The surface of a non-porous solid is desired for the complete exclusion of air during the process of slaking. Relatively over or under burned lime requires more time to absorb the necessary moisture for slaking than does normally-burned lime, while the latter does not absorb too much moisture by an extended—i. e., two minutes—exposure, provided there is a free drainage, and by my method all the various grades of burning which must reasonably be expected to result from different locations in the kiln can be properly moistened and slaked together. By the use of pulverized slaked lime as a covering an immediate and complete exclusion of air is formed by the fine powder. A complete shield is formed at once which is impervious to air and will not crack or separate by the movement of the slaking lime below by reason of the adhesiveness of its particles, which are rendered quasi-plastic by the moisture and steam below until all parts are dried by the heat at the completion of the slaking. The resulting product is a fertilizing-lime without any dross or adulteration to lessen its value as a fertilizer or to injure the machinery by which it is distributed. The lime 4 after screening, if necessary, is then ready for use as a fertilizer, being pulverized as fine as any mechanical means could grind it, of such a consistency that it will pass through ordinary drills without packing, and being completely hydrated it will never heat again. It is in a form to be immediately effective as a fertilizer. It is preferably placed in air-tight packages for storage until used.

Having described my discovery and invention, what I claim as new, and desire to secure by Letters Patent, is—

1. The herein-described improvement in the art of slaking quicklime, consisting in exposing it to moisture, and then excluding the air by a covering of pulverized slaked lime, substantially as specified.

2. The herein-described improvement in the art of slaking quicklime, consisting in exposing it to water on an inclined surface, and then excluding the air by a covering of pulverized slaked lime, substantially as specified.

In testimony whereof I have signed my name to this specification in the presence of two subscribing witnesses.

JAMES H. HARRIER.

Witnesses:
JOSEPH FREASE,
HARRY FREASE.